United States Patent
Mo et al.

(10) Patent No.: US 9,754,087 B2
(45) Date of Patent: Sep. 5, 2017

(54) METHOD FOR VERIFYING WEB SYSTEM LICENSE BASED ON MULTI-WAY TREE SEARCH

(71) Applicant: G-CLOUD TECHNOLOGY Co.Ltd., Dongguan, Guangdong (CN)

(72) Inventors: Zhanpeng Mo, Guangdong (CN); Song Yang, Guangdong (CN); Tongkai Ji, Guangdong (CN)

(73) Assignee: G-CLOUD TECHNOLOGY Co.Ltd, DongGuan, Guangdong (CN)

( * ) Notice: Subject to any disclaimer, the term of this patent is extended or adjusted under 35 U.S.C. 154(b) by 167 days.

(21) Appl. No.: 14/772,332

(22) PCT Filed: Dec. 19, 2014

(86) PCT No.: PCT/CN2014/094354
§ 371 (c)(1),
(2) Date: Sep. 2, 2015

(87) PCT Pub. No.: WO2015/180459
PCT Pub. Date: Dec. 3, 2015

(65) Prior Publication Data
US 2016/0350518 A1 Dec. 1, 2016

(30) Foreign Application Priority Data
May 26, 2014 (CN) .......................... 2014 1 0226500

(51) Int. Cl.
*G06F 21/10* (2013.01)
*H04L 9/06* (2006.01)
*H04L 29/06* (2006.01)

(52) U.S. Cl.
CPC ............ *G06F 21/105* (2013.01); *G06F 21/10* (2013.01); *H04L 9/0618* (2013.01); *H04L 63/0442* (2013.01); *G06F 2221/0773* (2013.01); *H04L 63/168* (2013.01)

(58) Field of Classification Search
CPC ........ G06F 17/00; G06F 17/20; G06F 21/105; G06F 17/30864; G06F 17/30887; G06F 21/10; H04L 9/06; H04L 9/0618; H04L 63/0442; H04L 63/0428; H04L 9/3268;
(Continued)

(56) References Cited

U.S. PATENT DOCUMENTS

| 7,143,289 | B2 * | 11/2006 | Denning | ................ G06F 21/10 380/258 |
| 7,516,147 | B2 * | 4/2009 | Kranz | ............... G06F 17/30887 |
| 2002/0199014 | A1 * | 12/2002 | Yang | ...................... H04L 29/06 709/238 |

* cited by examiner

*Primary Examiner* — Thanhnga B Truong

(57) ABSTRACT

A web system license based on multi-way tree search includes steps of: identifying a requiring URL of each function; using the requiring URL of the function as a mark, writing the mark in a license; encrypting the license for generating a cipher text, and storing the cipher text in a web system; during initializing of the web system, decrypting the cipher text and sending to a memory; establishing a multi-way tree according to a URL of an authorized function in the license; and receiving a requirement for a specific function by the web system, using the requiring URL as a searching value and matching in the multi-way tree; wherein if a corresponding URL is found, the function is authorized and further operation is required until response returning; if the corresponding URL is not found, the requirement is intercepted, and a response is returned.

2 Claims, 2 Drawing Sheets

(58) Field of Classification Search
CPC ... H04L 9/3297; H04L 63/12; H04L 45/7453;
H04K 1/00; G06Q 10/10
USPC .......... 713/193; 707/999.005, 797, 999.003,
707/999.01, 999.101, 999.102, 999.103,
707/999.104, 999.006, 999.009, 203;
705/57, 50, 52; 709/203
See application file for complete search history.

METHOD FOR VERIFYING WEB SYSTEM LICENSE BASED ON MULTI-WAY TREE SEARCH

CROSS REFERENCE OF RELATED APPLICATION

This is a U.S. National Stage under 35 U.S.C 371 of the International Application PCT/CN2014/094354, filed Dec. 19, 2014, which claims priority under 35 U.S.C. 119(a-d) to CN 201410226500.7, filed May 26, 2014.

BACKGROUND OF THE PRESENT INVENTION

Field of Invention

The present invention relates to a technical field of software license verifying, and more particularly to a method for verifying a web system license based on multi-way tree search.

Description of Related Arts

After a user buys software, a software system generally restricts functions which can be used by a license. Conventionally, verifying mechanism of software license is as follows:

1, the user provides some information to a software provider, such as version information and license validity;

2, the software provider generates a license for the user, then the user opens the license and put information thereof into the software for verifying;

3, during operation, the software accesses to software version information in the license, such as business version; then a function collection of the version is authorized to the user, but functions out of the function collection are not available.

The method has the following problems:

1, the license returned from the software provider comprises clear message, which is easy to leak;

2, function collection information of a specific version is contained in the software; if the function collection information is modified, the user is able to use functions out of the function collection of the version;

3, flexibility of software verifying is low, controllable granularity is not small enough.

SUMMARY OF THE PRESENT INVENTION

An object of the present invention is to provide a web system license verifying mechanism, so as to solve problems of the conventional web system that license verifying mechanism is not safe and authorizing granularity is too large.

Accordingly, in order to accomplish the above object, the present invention provides:

a method for verifying a web system license based on multi-way tree search, comprising steps of:

step 1: identifying a requiring uniform resource locator (URL for short) of each function;

step 2: using the requiring URL of the function as a mark, writing the mark in a license;

step 3: encrypting the license with an asymmetric encryption algorithm for generating a cipher text, and storing the cipher text in a web system;

step 4: during initializing of the web system, decrypting the cipher text with a corresponding asymmetric decryption algorithm, and sending to a memory;

step 5: establishing a multi-way tree according to a URL of an authorized function in the license; and step 6: receiving a requirement for a specific function by the web system, using the requiring URL as a searching value and matching in the multi-way tree; wherein if a corresponding URL is found, the function is authorized and further operation is required until response returning; if the corresponding URL is not found, the requirement is intercepted, and a response is returned that the specific function required is not authorized.

The requiring URL is a unique identifier for accessing a certain page of the web system or calling a certain interface of the web system; the requiring URL has a multi-level structure, levels thereof are divided with a semicolon, such as http://xx.xx.xx/a/b/c, wherein http://xx.xx.xx doesn't need to be written in the license, and/a/b/c is similar to a file path structure. For example, a and b are both a type of restricting the certain page or calling the certain interface of the web system.

Encrypting with the asymmetric encryption algorithm comprises encrypting the license with a public key; decrypting with the asymmetric decryption algorithm comprises decrypting the license with a private key, for avoiding faking the license, and avoiding failure of the license verifying mechanism due to losing of any of the keys.

Decrypting the cipher text and sending to the memory comprises decrypting the license in the cipher text into a clear text, and storing the clear text as an object of the memory instead of in a file, for avoid stealing.

Establishing the multi-way tree according to the URL of the authorized function in the license comprises steps of:

step 1: dividing each function URL in the license with "/" for forming identifiers with different levels;

step 2: firstly providing a root node "/" of the multi-way tree, secondly inserting the identifiers into the multi-way tree as tree nodes according to the levels; and step 3: stopping inserting if a same node exists under a same root node, and repeating until all function URLs are treated; then establishing the multi-way tree.

Using the requiring URL as the searching value and matching in the multi-way tree comprises steps of:

step 1: dividing each requiring URL with "/" for forming identifiers with different levels; and step 2: searching a first-level identifier of the requiring URL in a second-layer node of the multi-way tree, wherein if the first-level identifier is not found, then the requiring URL is not authorized; if the first-level identifier is found, then searching a second-level identifier of the requiring URL in a third-layer node of the multi-way tree, wherein if the second-level identifier is not found, then the requiring URL is not authorized; if the second-level identifier is found, then searching a third-level identifier of the requiring URL in a fourth-layer node of the multi-way tree; and repeating; wherein if a last-level identifier is found, then the requiring URL is authorized, and a corresponding function is also authorized.

Advantages of the present invention are as follows:

1, the license of the present invention is storage in a cipher text form, and after decrypting, the license is difficult to be stolen, which is highly safety.

2, the present invention is able to provide fine granularity authorizing, which is suitable for verifying of a large web system with a lot of functions.

3, according to characteristics of the web system, the method of the present invention establishes a multi-way tree model for a comparison function collection, which significantly improves verifying efficiency of function authorizing, and is better than algorithm complexity O(n) of a conventional one-by-one comparison mechanism; algorithm complexity of the multi-way tree searching of the present invention is similar to algorithm complexity $O(\log_2 n)$ of a binary-way tree.

BRIEF DESCRIPTION OF THE DRAWINGS

Referring to drawings, the present invention is further illustrated.

DETAILED DESCRIPTION OF THE PREFERRED EMBODIMENT

Figure 1:
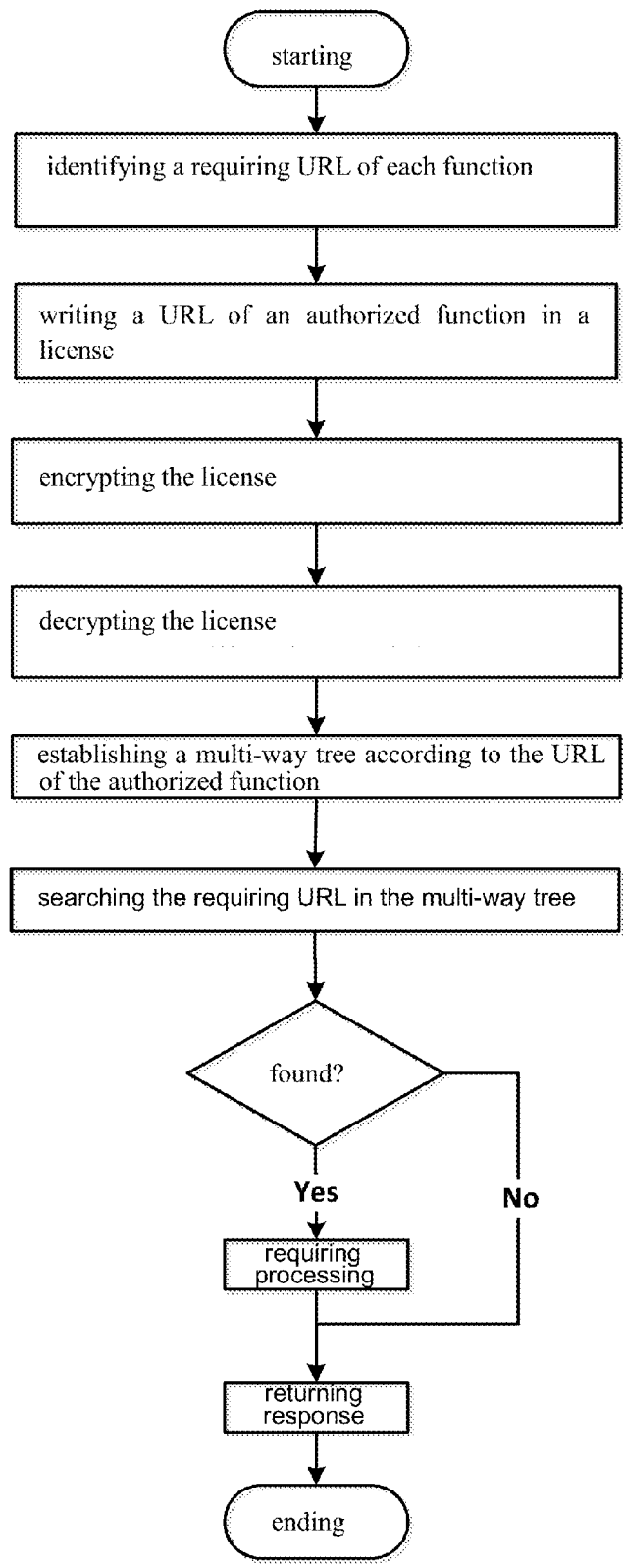
FIG. 1 is a flow diagram of the present invention.
Figure 2:
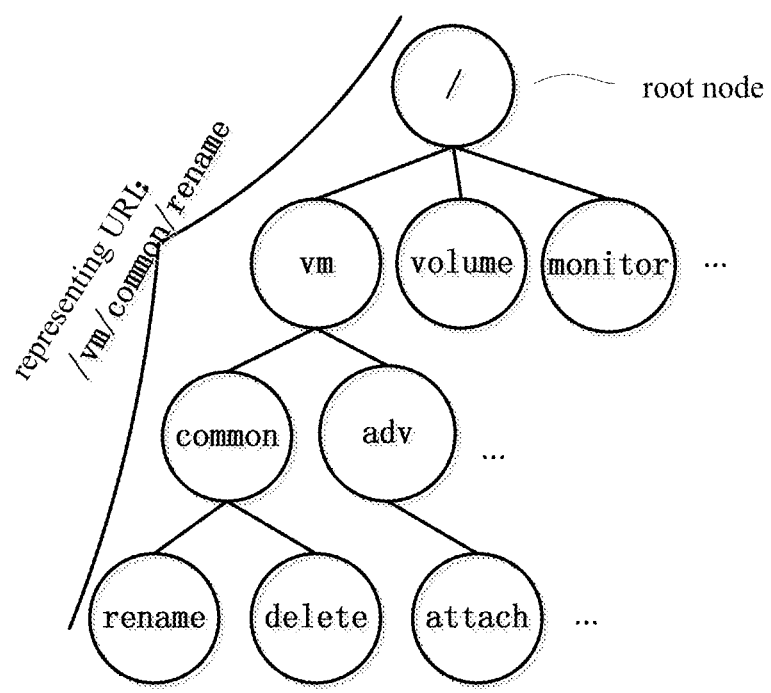
FIG. 2 is a sketch view of a multi-way tree of the present invention.

Referring to the drawings, there are several asymmetric encryption algorithms, and the present invention use RSA algorithm.

Firstly, a key value of id/path is written into a License.properties. For example:

```
Product.name=Gcloud
Product.version=6.2
License.type=Commercial
License.expiry=2014-06-06
Server.macaddress=00-1B-77-2C-9D-8F
License.vmMaxNum=200
#function requiring URL
111=/vm/renameInstance
112=/vm/deleteInstance
KeyRSA keyRsa = new KeyRSA( );
String password= keyRsa.Decoder(new
String(fileUtil.readFile(keyPath + "/AES.dat")));
//encryption
System.out.println("before encryption:" + content);
byte[ ] encryptResult = key.encrypt(content, password);
String enStr = new String(encryptResult);
System.out.println("after encryption:" + enStr);
wherein a multi-way tree is established by Java:
//tree node
public class TreeNode
{
   //node Id
   private String nodeId;
   //parent node Id
   private String parentId;
   //text
   private String text;
   public TreeNode(String nodeId)
   {
      this.nodeId = nodeId;
   }
   public TreeNode(String nodeId, String parentId)
   {
      this.nodeId = nodeId;
      this.parentId = parentId;
   }
   //wherein getter and setter methods of attributes are not illustrated
}
//multi-way tree node
public class ManyTreeNode
{
   //node data
   private TreeNode data;
   //child node collection
   private List childList;
   public ManyTreeNode(TreeNode data)
   {
      this.data = data;
      this.childList = new ArrayList( );
   }
   public ManyTreeNode(TreeNode data, List childList)
   {
      this.data = data;
      this.childList = childList;
   }
   //wherein getter and setter methods of attributes are not illustrated
}
//generation and traversal of the multi-way tree
public class ManyNodeTree
{
   //root
   private ManyTreeNode root;
   public ManyNodeTree( )
   {
      root = new ManyTreeNode(new TreeNode("/"));
   }
   //generation of the multi-way tree
   public ManyNodeTree createTree(List treeNodes)
   {
      if(treeNodes == null || treeNodes.size( ) < 0)
         return null;
      ManyNodeTree manyNodeTree = new ManyNodeTree( );
      //adding all nodes into the multi-way tree
      for(TreeNode treeNode : treeNodes)
      {
         if(treeNode.getParentId( ).equals("root"))
         {
            //adding a node to the root
            manyNodeTree.getRoot( ).getChildList( ).add(new ManyTreeNode(treeNode));
         }
         else
         {
            addChild(manyNodeTree.getRoot( ), treeNode);
         }
      }
      return manyNodeTree;
   }
   //searching the multi-way tree
   public String iteratorTree(ManyTreeNode manyTreeNode, String text)
   {
      StringBuilder buffer = new StringBuilder( );
      buffer.append("\n");
      if(manyTreeNode != null)
      {
         for (ManyTreeNode index : manyTreeNode.getChildList( ))
         {
            buffer.append(index.getData( ).getNodeId( )+ ",");
            if (index.getChildList( ) != null &&
               index.getChildList( ).size( ) > 0 )
            {
               buffer.append(iteratorTree(index));
            }
         }
      }
      buffer.append("\n");
      return buffer.toString( );
   }
wherein a URL which cannot be found is intercepted
   public void doFilter(ServletRequest request,
            ServletResponse response, FilterChain chain) throws
            IOException, ServletException {
      HttpServletRequest req = (HttpServletRequest) request;
      HttpServletResponse res = (HttpServletResponse) response;
      //obtaining requiring URL
      String reqURL = req.getRequestURL( ).toString( );
      //comparing reqURL with each event in functionList
      //if iteratorTree(reqURL)==null
      //the res.setStatus(403) and renturn
//intercepting, and redirecting to an error: 403 page
      //if not, chain.doFilter(request, response);
      //not intercepting, and leaving for a next filter
   }.
```

What is claimed is:

1. A method for verifying a web system license based on multi-way tree search, comprising steps of:

step 1: identifying a requiring uniform resource locator (URL for short) of each function;
step 2: using the requiring URL of the function as a mark, writing the mark in a license;
step 3: encrypting the license with an asymmetric encryption algorithm for generating a cipher text, and storing the cipher text in a web system;
step 4: during initializing of the web system, decrypting the cipher text with a corresponding asymmetric decryption algorithm, and sending to a memory;
step 5: establishing a multi-way tree according to a URL of an authorized function in the license; and
step 6: receiving a requirement for a specific function by the web system, using the requiring URL as a searching value and matching in the multi-way tree; wherein if a corresponding URL is found, the function is authorized and further operation is required until response returning; if the corresponding URL is not found, the requirement is intercepted, and a response is returned that the specific function required is not authorized;
wherein the requiring URL is a unique identifier for accessing a certain page of the web system or calling a certain interface of the web system; the requiring URL has a multi-level structure, levels thereof are divided with a semicolon;
wherein encrypting with the asymmetric encryption algorithm comprises encrypting the license with a public key; decrypting with the asymmetric decryption algorithm comprises decrypting the license with a private key;
wherein decrypting the cipher text and sending to the memory comprises decrypting the license in the cipher text into a clear text, and storing the clear text as an object of the memory;
wherein establishing the multi-way tree according to the URL of the authorized function in the license comprises steps of:
step 1: dividing each function URL in the license with "/" for forming identifiers with different levels;
step 2: firstly providing a root node "/" of the multi-way tree, inserting the identifiers into the multi-way tree as tree nodes according to the levels; and
step 3: stopping inserting if a same node exists under a same root node, and repeating until all function URLs are treated; then establishing the multi-way tree.

2. The method, as recited in claim 1, wherein using the requiring URL as the searching value and matching in the multi-way tree comprises steps of:
step 1: dividing each requiring URL with "/" for forming identifiers with different levels; and
step 2: searching a first-level identifier of the requiring URL in a second-layer node of the multi-way tree, wherein if the first-level identifier is not found, then the requiring URL is not authorized; if the first-level identifier is found, then searching a second-level identifier of the requiring URL in a third-layer node of the multi-way tree, wherein if the second-level identifier is not found, then the requiring URL is not authorized; if the second-level identifier is found, then searching a third-level identifier of the requiring URL in a fourth-layer node of the multi-way tree; and repeating; wherein if a last-level identifier is found, then the requiring URL is authorized, and a corresponding function is also authorized.

\* \* \* \* \*